June 14, 1966 G. MERZ 3,256,513

METHOD AND CIRCUIT ARRANGEMENT FOR IMPROVING THE OPERATING RELIABILITY OF ELECTRONICALLY CONTROLLED TELECOMMUNICATION SWITCHING SYSTEMS

Filed Oct 3, 1961 2 Sheets-Sheet 1

INVENTOR.
G. MERZ
BY [signature]
ATTORNEY:

June 14, 1966 G. MERZ 3,256,513

METHOD AND CIRCUIT ARRANGEMENT FOR IMPROVING THE OPERATING RELIABILITY OF ELECTRONICALLY CONTROLLED TELECOMMUNICATION SWITCHING SYSTEMS

Filed Oct. 3, 1961 2 Sheets-Sheet 2

INVENTOR.
G. MERZ
BY Paul W. Hemminger
ATTORNEY.

United States Patent Office 3,256,513
Patented June 14, 1966

3,256,513
METHOD AND CIRCUIT ARRANGEMENT FOR IMPROVING THE OPERATING RELIABILITY OF ELECTRONICALLY CONTROLLED TELECOMMUNICATION SWITCHING SYSTEMS

Gerhard Merz, Rommelshausen, Wurttemberg, Germany, assignor to International Standard Electric Corporation, New York, N.Y., a corporation of Delaware Filed Oct. 3, 1961, Ser. No. 142,679
Claims priority, application Germany, Oct. 6, 1960, St 16,978
3 Claims. (Cl. 340—146.1)

This invention relates to a method of improving the operating reliability of electronically controlled telecommunication exchange systems in which a central equipment is adapted to control the operating functions of the entire system, and in which, for the purpose of increasing the operating reliability, two such control equipments are arranged so as to operate in parallel with their functions being supervised by special testing arrangements. Moreover, the invention relates to a circuit arrangement for carrying out the method according to the invention.

The use of electronic circuit elements in the fields of telecommunication switching engineering called for the development of new methods particularly suitable for controlling the switching systems. Since electronic circuit elements are suitable for performing switching operations at a very high speed, they are particularly suitable for being multiply utilized in time-division multiplex methods.

In time-division multiplex methods the establishment of a connection is controlled by one control device provided in common to the entire system, in dependency upon the information indicating the respective customer wishes in regard to connections to be established by the individual subscribers, on account of the evaluation of which the control arrangement provides the corresponding switching instructions. However, the provision of one single control arrangement provided in common to the entire system has the disadvantage that the whole system has to be put out of operation in the event of a failure of the common control arrangement. It is well-known to eliminate this shortcoming by using error-correcting codes, as well as the corresponding testing and correcting devices, for increasing, in this way, also the operating reliability of the system. But still the disadvantage will remain that the entire system is put out of operation whenever the common control arrangement is due for repair. In addition thereto the fault-finding (error-shooting) is rendered very difficult in systems having such a complicated construction.

It has therefore already been proposed to provide two independent control arrangements comprising the respective testing devices in the system, the one of which being adapted to control the operation, while the other one serves as the stand-by equipment. In the event of trouble there is effected an automatic switch-over from the disturbed to the stand-by equipment, so that it is possible to look for the cause of the trouble in the disturbed control arrangement, and to remove the trouble without affecting the operation of the entire system. This method of using two independent control arrangements, however, requires the use of a rather expensive automatic arrangement for effecting the switching-over from the one to the other control arrangement, and vice versa; moreover, this switchover operation is usually entailed by a short interruption of the operation of the system. The invention is therefore based on the problem of avoiding these disadvantages, and of achieving a greater insusceptability to interferences of the control arrangements.

The invention proposes the employment of two control arrangements of the same type within one system, which operate in parallel and whose functions are supervised by testing devices. The invention is characterised by the fact that two electronic control arrangements, which are of the same type among each other, are used to effect the simultaneous reception and evaluation of the control information, that furthermore there is exclusively used a code which is capable of being tested with respect to errors of the first order, and that this code is tested in selected transmission arrangements within the control arrangement, and that the two control arrangements operating in parallel are in such a way coupled to one another in those transmission stages in which the code is being tested, that the outputs of that particular group of circuit elements of one of the two control arrangements in which the code-testing device assigned thereto has detected an error, are blocked thereby, so that only the output signals of the non-disturbed control arrangement are transferred to the undisturbed control arrangement, as well as also to the non-disturbed portions of the respectively other control arrangement.

In this way it is warranted that in the case of a failure of one group of circuit elements placed between two transmission or control stages of one of the two control arrangements, only this particular group of circuit elements which is actually affected by the disturbance, is rendered ineffective whereas all other groups of circuit elements of the control arrangements, which have remained free from interferences (disturbances) will remain in operation, so that within these ranges the parallel operation remains to exist now as before. In this way there is achieved a considerable increase in the operating reliability, because the probability of a failure of the entire system is substantially reduced. Furthermore, it is possible to remove individual groups of circuit elements from the control arrangements for the purpose of replacement or repair, without the operating ability of the entire system being disturbed thereby. Care must only be taken that always that one of the two groups of circuit elements performing the same functions, will remain in operation in one of the two control arrangements.

The circuit arrangement for carrying-out the method according to the invention is characterized by the fact that in transmission arrangements between two successively following groups of circuit elements of the two control arrangements there are provided code-testing devices adapted to prevent the information from being transferred by blocking the outputs of the disturbed group of circuit elements in cases where the code is recognized as being faulty, that furthermore the outputs of two equivalent groups of circuit elements in the transmission arrangements are connected directly and in a crosswise manner to the inputs of two OR-circuits, at the outputs of which, independently of a disturbance appearing in one of the preceding groups of circuit elements of the two parallel-operating control arrangements, there will always appear the correct information. In this way it is accomplished that the correct information will again be applied in the parallel manner to all groups of circuit elements that are still capable of operating and are arranged subsequently to the disturbed group of circuit elements, so that accordingly in each of the following control stages there is maintained the parallel operation of the corresponding groups of circuit elements in both control arrangements.

According to a further embodiment of the circuit arrangement according to the invention it is provided that to the storage devices and to the code-testing device provided for each information unit at the output of one group of circuit elements, there is assigned a suppressor circuit consisting of one or more series-connected transistors, which is adapted to effect the disconnection of the operating voltage for the output amplifiers of the storage devices in dependence upon a control potential which appears after an error has been detected by the testing device. In this way there is effected the blocking of the outputs of the disturbed transmission or control stage, as well as the corresponding controlling of the gates acting as the OR-circuits.

The invention will now be explained in detail with reference to an example of embodiment shown in the accompanying drawings, in which.

An electronic control arrangement for telecommunication switching (or exchange) systems, as being the subject matter of the present invention, substantially consists of the following four main stages:

Input and output devices
Information storage device
Translator
Programmer

Each of these four major components can still be further subdivided. Between the individual parts of the control arrangement the addresses, the information in the form of numerals, and the switching instructions are transmitted in a coded fashion, preferably as binary numbers. In many cases, and for the purpose of providing a better possibility of detecting errors, there are used such types of codes for the transmission of the information, which are capable of being tested with respect to errors of the first order. To this end there are mostly used codes of the "*m* out of *n*"-type, that is, of the *n*-positions of a character *m* are in the state 1, and *n*—*m* are in the state 0. When changing over from one group of circuit elements to the next group of circuit elements within a control arrangement the code is respectively tested as to whether all positions of the character are properly occupied. If this test reveals that the information has been falsified by changing one position of a character, for example, because instead of a 0 there appears a 1, or vice versa, then corresponding measures have to be initiated for preventing a faulty function (operation). In many cases it is necessary to put the system out of operation until the trouble (or error) has been removed. In telecommunication switching systems it is therefore necessary, for the sake of maintaining a reliable operation, to provide at least two control arrangements of the same type, which operate in parallel, and of which the one is put out of operation as soon as an error is detected in the course of its operation, so that in the meantime the second control arrangement alone takes over the function of the first control arrangement which has been put out of operation, until the disturbed control arrangement is again ready to operate.

The probability of an error appearing in the entire control arrangement is substantially greater than the probability of an error appearing only in a certain group of circuit elements of this particular control arrangement. It is therefore of advantage to the operating reliability to couple the individual groups of circuit elements of the control arrangement always at that particular point, where a testing of the code is effected.

Figure 1:
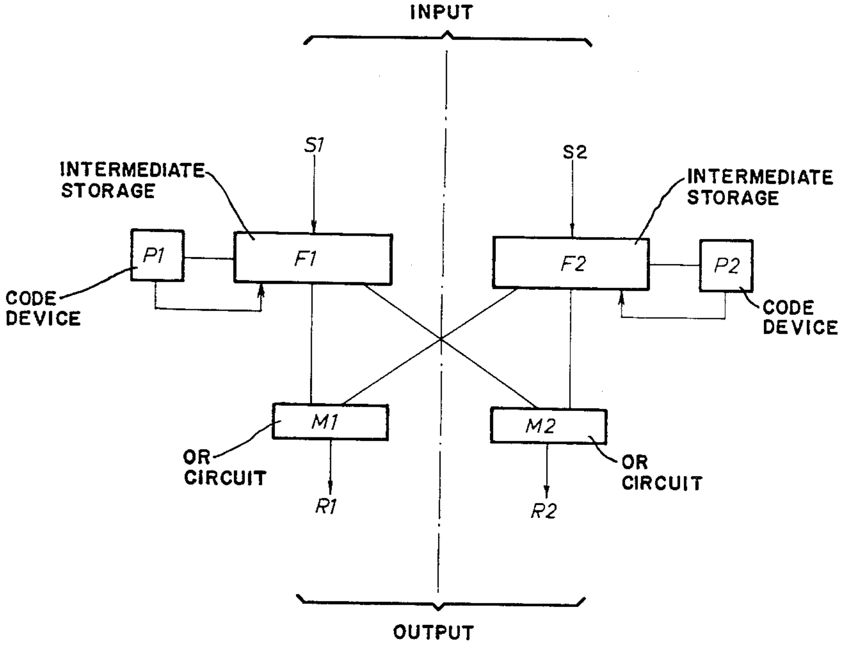
FIG. 1 shows a block diagram for explaining the method.

In FIG. 1 this is shown with reference to the example of a transmitting arrangement. From the similarly act-groups of circuit elements S1, S2 of the parallel-connected control arrangement, the information is transferred to the intermediate storage devices F1 and F2 which are designed e.g. as bistable trigger arrangements. While the transmitted information is retained in the intermediate storages F1 and F2, it is tested with respect to code errors by the code-testing devices P1 and P2. The outlets of the two intermediate storages F1 and F2 are connected in the manner shown in FIG. 1, to the OR-circuits M1 and M2 whose outlets R1 and R2 are connected to the subsequently following equivalent groups of circuit elements of the two control arrangements. If now the same information is applied to the outlets of the intermediate storages F1 and F2, then the same information will also appear at the outlets R1 and R2. However, if the information stored e.g. in the intermediate storage device F1 has been detected by the associated code-testing device P1, and is indicated as being faulty, then this device will block the outlets of the intermediate storage device F1. In other words, this storage device has no longer an influence upon the OR-circuits M1 and M2. However, in spite of this the correct information will appear at the outlets R1 and R2 thereof, which information originates from the outlets of the intermediate storage device F2.

In this way both of the control arrangements will continue to operate in the system if any of the groups of circuit elements in the first mentioned control arrangement is faulty, and if at the same time, another group of circuit elements not corresponding to the above mentioned one, is detected to have an error in the second control arrangement.

Figure 2:
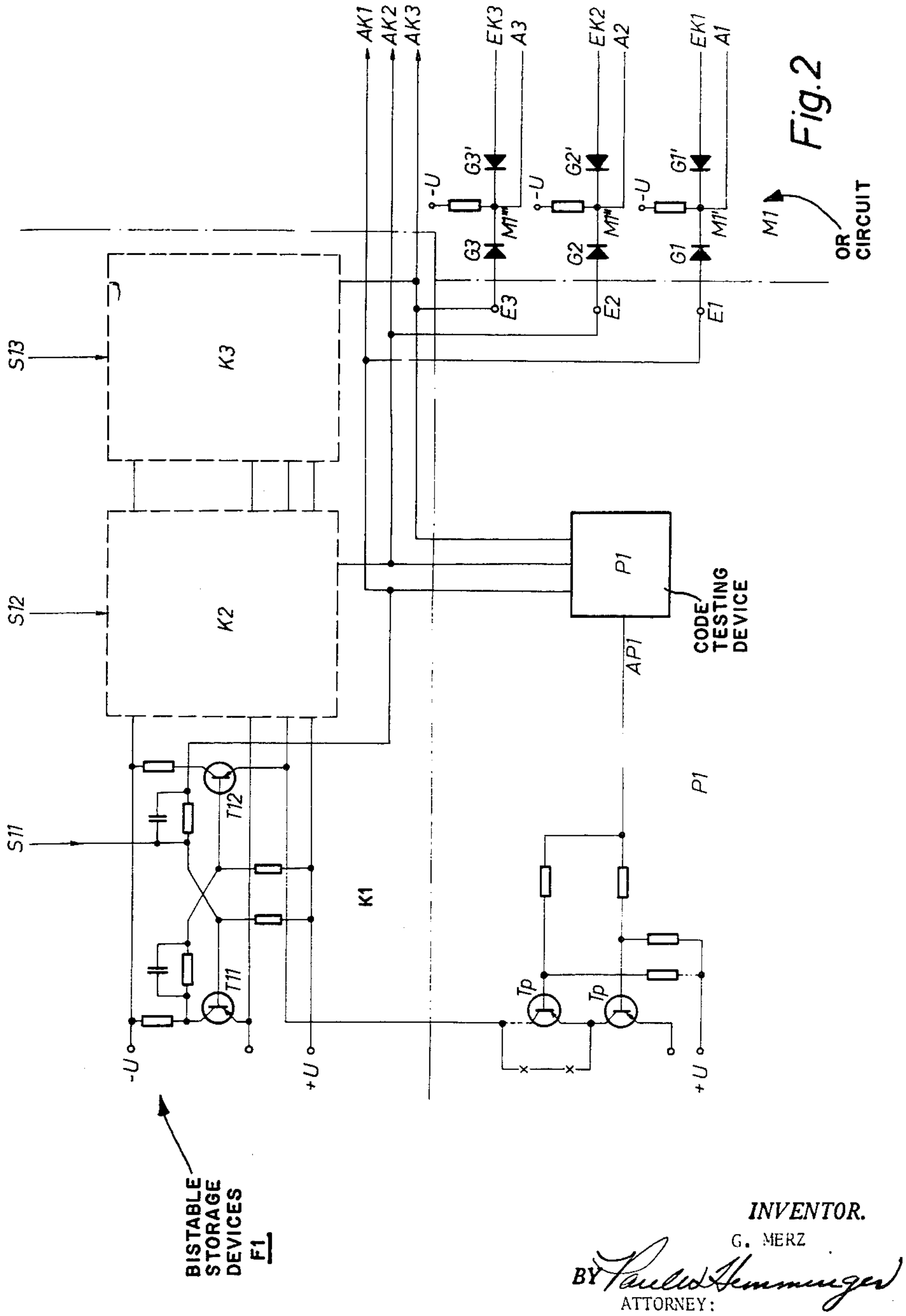
FIG. 2 shows a circuit diagram of a storage device composed of bistable trigger arrangements, to which the method according to the invention is applied.

FIG. 2 shows a circuit arrangement which, by way of example, is composed of semiconductor circuit elements, and which may be used to carry out the method according to the invention.

Assuming now that the information to be transferred consists of three bits that are fed into the three bistable trigger arrangements K1, K2 and K3 from the storage device via the inputs S11, S12 and S13 and are stored therein. The circuit arrangement of FIG. 2 only shows that part of the entire arrangement belonging to the one of the two control arrangements; the part belonging to the other control arrangement is of exactly the same design, but is not shown in the drawing for reasons of clarity.

To the outputs AK1, AK2 and AK3 of the storage stages K1, K2 and K3 there are connected on one hand the first inputs E1, E2 and E3 of the three OR-circuits M1′, M1″ and M1‴ which are led via the directional conductors G1, G2 and G3, and on the other hand there are connected the three inputs of the code-testing device P1, the second inputs EK1, EK2 and EK3 of the three OR-circuits M1′, M1″ and M1‴ which are led via the directional conductors G1′, G2′ and G3′, are applied to the outputs of the not shown storage stages belonging to the other control arrangement. The output signal appearing at the outputs A1, A2 and A3 of the OR-circuits M1′, M1″ and M1‴ is only positive if each time at least one of the two inputs $E_1$ and $EK_1$ or $E_2$ and $EK_2$ or $E_3$ and $EK_3$ is applied to a positive control potential. If, to the inputs EK1, EK2 and EK3 there is applied the same information as is stored in the storage stages K1, K2 and K3, then the same information will also appear again at the outputs A1, A2 and A3. However, if it is detected by the code-testing device P1 that there exists a code error, and that accordingly, a faulty information is stored in the storage stages K1, K2 and K3, then the code-testing device P1 which is designed in the manner known per se, will deliver a positive potential at its output AP1 serving to block the transistor T*p* which is unblocked in its normal condition. In this way the transistors T12, . . . which are connected to the outputs of the storage stages K1, K2 and K3, are disconnected from the zero potential, and the potentials at all outputs become negative. This, however, effects that the output potentials of the storage stages K1, K2 and K3 no longer have an influence upon the signals appearing at the outputs A1, A2 and A3 of the OR-circuits M1′, M1″ and M1‴, and consequently that particular information will appear at the outputs A1, A2 and A3, which is still applied to the inputs EK1, EK2 and EK3 from the second control arrangement.

The invention is in no way restricted to the use in telecommunication systems, but can also be advantageously used in any other kind of information- (or data-) processing systems.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In an electronically controlled telecommunication system, a centralized system control means including two identical and separate means for receiving and storing signals used to control the system, said signals being transmitted in an M out of N coded combination, means for transmitting said signals to said storage means, means for separately testing and comparing signals stored in said two separate storage means to detect code errors of the first order, means for coupling together the output of said two separate means, and means for selectively blocking the output of a faulty one of said two separate storage means responsive to the detection of an error of said first order, said signals thereafter being sent from the other of said two storage means to both of said outputs.

2. The system of claim 1 wherein said testing means comprises code testing means for recognizing faulty codes, said means for coupling together said outputs comprises two OR gates for transmitting the outputs of said two separate means, the outputs of each of said two separate means being connected directly to the input of an individually associated one of said OR gates and cross connected to an input of the OR gate associated with the other of said two means, and means comprising the outputs of at least one of said OR gates for transmitting a non-faulty replica of said signals.

3. The system of claim 2 wherein each of said two separate means comprises a plurality of bistable storage elements, there being one storage element for each stored bit of information, said blocking means comprising a plurality of transistors coupled in series, and means responsive to an output of said testing means for controlling at least one of said transistors to effectively disconnect the outputs of said bistable elements from said OR gates.

References Cited by the Examiner

UNITED STATES PATENTS 2,892,888 6/1959 James et al. ---------- 178—23

FOREIGN PATENTS 785,961 11/1957 Great Britain.

ROBERT C. BAILEY, *Primary Examiner.*

W. C. COOPER, MALCOLM A. MORRISON, *Examiners.*

R. M. GOLDMAN, M. P. ALLEN, *Assistant Examiners.*